April 2, 1968   W. A. SEEDER   3,375,792
HEATING SYSTEM FOR TUNNEL BAKING OVEN AND LIKE HEATING CHAMBERS
Filed Sept. 8, 1964

INVENTOR
Wilhelm Adolf Seeder
BY Arnold Robinson
ATTORNEY

United States Patent Office 3,375,792
Patented Apr. 2, 1968

3,375,792
HEATING SYSTEM FOR TUNNEL BAKING OVEN AND LIKE HEATING CHAMBERS
Wilhelm A. Seeder, Aerdenhout, Netherlands, assignor to Koninklijke, Verkade Fabrieken, N.V., Zaandam, Netherlands, a limited-liability company of the Netherlands
Filed Sept. 8, 1964, Ser. No. 394,853
Claims priority, application Netherlands, Sept. 9, 1963, 297,669
5 Claims. (Cl. 107—55)

This invention relates to tunnel baking oven heating systems adapted for baking articles of food and the like having heating chambers of the type provided with metal tubes through which heating gases stream from burners which are situated at the open entrance end of the tubes.

Conventionally the heating tubes are arranged in horizontal planes one group at the upper and another at the bottom side of the oven each comprising a row of from eight to ten tubes for example, bearing freely upon supports, so that expansion in a longitudinal direction is made possible.

Between these rows of tubes a conveyer-belt bearing the baking ware runs through the length of the oven tunnel. As the radiation of heat must be directed to the ware the tubes radiate their heat substantially on one side only, the other side being heat insulated by layers or walls of insulating material. Therefore the opposite portions of the tube walls attain very different temperatures. Also opposite tube wall portions will not be uniformly heated by the long flames of the burners and by the hot gases streaming through the length of the tubes.

The main object of the present invention is to prevent warping of the tubes which would normally result from the above indicated uneven temperatures at opposite sides of the tube walls and thus to compensate for undesirable sagging of the tubes. Further objects relate to development of means to prevent this sagging by simple automatic means, the effect of which can be depended on under all circumstances.

The invention will be described hereinafter by way of example with reference to the accompanying drawing in which.

Figure 1:
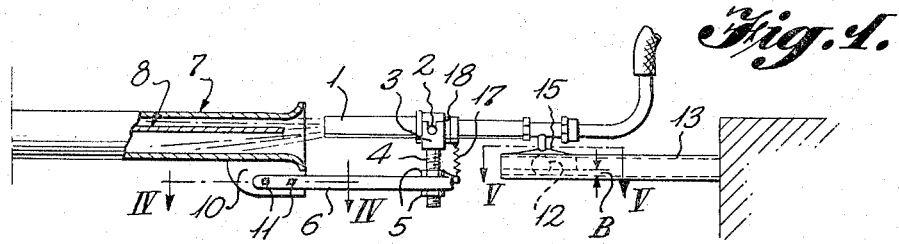
FIG. 1 is a schematic side-view of the mouth of a heating tube a part of which is cut away and of a burner accommodation opposite the entrance-side of the tube.
Figure 6:
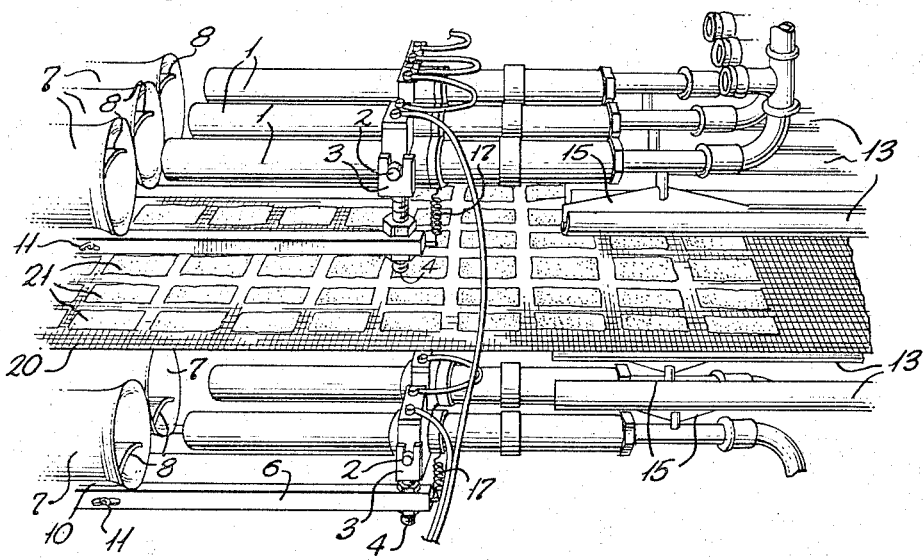
FIG. 6 is a perspective view on a burner arrangement before the entrance of the tunnel space of a baking oven.

In FIGURES 1 and 6 it can be seen that a burner 1 is mounted in a manner to be described hereinafter opposite each tube of two groups of heating tubes 7 arranged in rows above and below the tunnel space of a baking oven through which a conveyor 20 runs bearing the food articles 21 to be baked. The burning gases from the burner 1 stream through the tubes 7 in a longitudinal direction and their heat is radiated to the ware 21.

The heating tubes 1 are made from metal and because of its coefficient of expansion, a material expansion of the tubes occurs as a result of the necessarily great length of the oven and hence of the tubes. The change in length during the heating and cooling of the oven can be simply taken care of by means of a free support for the tubes. As however the tubes are mounted at one side against the insulation of the oven body, the other side radiating heat to the baking space, these tube sides will normally have far different temperatures which will cause, especially at the entrance-side where the highest temperatures reign, considerable differences in expansion of the material so that warping of the metal heating tubes occurs to an intolerable extent.

Now as a part of the present invention a screen or partition wall 8 runs lengthwise through each tube 7 and terminates opposite a burner 1 to divide the tube 7 into two sections one above the other. In this embodiment the burner 1 adjusts itself automatically with respect to the plane of the screen 8 to balance the amount of heating gas supplied to each tube section so that the heating tube will have adequately even temperatures on both sides of the screen to prevent warping of the tube.

In the embodiment as shown the tubes are divided by a horizontal screen because warping is mainly to be feared in a vertical direction. However, the screen 8 can always be positioned in such a way that warping in another direction can be compensated. This may for instance be necessary for the outer tubes of a row because there the temperature gradient may be asymmetric with respect to the vertical plane.

How the proportion of the amount of hot gases streaming above and below the screen 8 is adjusted to compensate for the tendency of the tube 7 otherwise to sag due to the uneven temperatures at the opposite wall portions is now described by way of example with reference to FIGURES 1, 4 and 5.

The burner 1 is supported in its middle portion by means of joint pins 2 extending from the side of the burner and bearing in a fork shaped support 3, comprising a screw pin 4 which is fastened and adjustable in height, by means of nuts 5, to an arm 6 connecting it with the entrance end of the tube 7. By means of the pin 4 the burner is adjusted so that it takes a zero position in horizontal alignment with the screen 8 when the burner is not in use.

Figure 4:
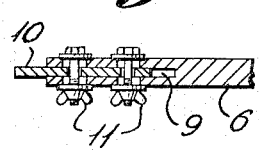
FIG. 4 shows a top view on a detail cross section along the line IV—IV in FIG. 1.

The distance between the mouth of the tube 7 and the burner 1 can be adjusted by shifting the control arm 6 which is provided with a slot 9 (see FIG. 4) along the plate 10 which is welded to the mouth of the tube, which shifting is made possible as by means of clamping bolts provided with winged nuts 11 (see FIG. 6), FIGS. 1 and 4 indicating only the center lines of these bolts.

The outer end of the burner 1 is supported by a ball joint 12 so that this support can follow all changes in direction of the burner. In order to be able to follow also a shifting of the burner in a longitudinal direction, the ball joint 12 is horizontally movable in a fixed guide tube 13 which has an inner diameter substantially equal to the outer diameter of the ball and which is provided with a longitudinal slot 14 (FIG. 5) through which a slide shaped ball bearer 15 passes and which is connected to the burner 1 (FIG. 1).

Figure 5:
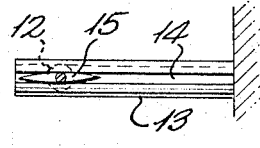
FIG. 5 is a top view of a detail in a cross section along the line V—V of FIG. 1.

As shown in FIG. 5 the side walls of the slide piece 15 are curved so that a limited possibility of rotation around a vertical axis of the burner is allowed. Further the lower boundary of this slide piece 15 is at a distance "B" (FIG. 1) from the bottom side of the guide tube 13 by which the change of the burner angle around the horizontal axis 2 is limited. The ball joint 12 fits slidably in the tube 13 and is made in one solid piece with the slide piece 15. However, the lower portion of the ball joint 12 extends a distance B below the lower edge of the piece 15. Therefore, when the ball joint 12 is inserted in the tube the lower edge of the piece 15 will be at a distance B above the lowest bottom part of the inner cross-section of the tube 13.

A spring 17 which is connected between the end of the arm 6 and the socket 18 of the burner 1 ensures a good engagement of the burner journals 2 in the brace 3 during the movements transmitted to the burner. In the present embodiment (FIGS. 2 and 3) the screens 8 are arched in an upward direction and are freely supported by a number of studs 19 attached to the inner wall of the tube 7.

Figures 2, 3:
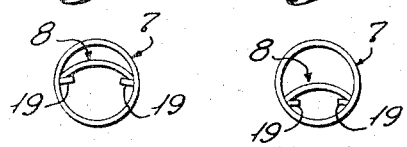
FIG. 2 shows schematically a front view of one of the heating tubes for the upper side of a tunnel baking oven.
FIG. 3 is a like front view of a heating tube for the lower side of the same oven.

Further it can be seen from FIGS. 2, 3 and 6 that the greater part of the heating gases will normally pass on that side of the screen which is directed to the baking ware.

Further it will become clear now that for instance, on a downward warping of the foremost part of an upper tube 7, the outer end of the arm 6 moves also downwardly and therewith the brace 3 is moved in a downward direction. The burner 1 turns downward around the supporting point 12 during which the journals 2 turn in the brace 3 and the burner will take a downward inclination whereby a greater part of the heating gases than before are led under the screen 8. Thus the lower tube will take more heat, will expand more and thus the warping is removed.

Figure 7:
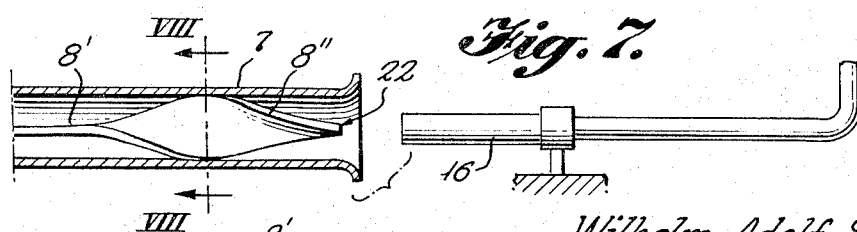
FIG. 7 is a vertical longitudinal cross-sectional view of a modified embodiment of the invention by which the object thereof is obtained in a simple, fixed position of the burner.
Figure 8:
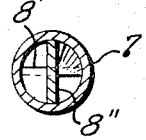
FIG. 8 shows a cross section of the tube along the line VIII—VIII of FIG. 7.

FIG. 7 shows a longitudinal section of the tube 7 wherein the forward part 8' of a screen 8 has the shape of a screw making only a half turn. The screen 8', apart from its part 8", extends horizontally as does the forward end edge 22 of screen part 8". Opposite the screen end 22, burner 16 is provided. A coupling between the burner and the tube for adjustment of inclination depending on a movement of the end of the tube 7 is not necessary in this embodiment, because the part of the gases entering the tube above the screen end 22 are led by the screw part 8" to the lower side of the tube. Thus when the tube end moves downward because of uneven expansion more hot gases will enter the tube above the screen end 22 and they will reach the lower side of the tube thanks to the screw part 8" so that the tendency of warping is balanced out in this way. Of course a tube on the bottom side of the oven has a tendency to warp in upward direction and then a greater part of the gases will enter below the forward end of the screen and be led to the upper side of the tube wall.

The screen part 8", can be made of ceramic material to be followed up further on the way, through the tube 7 when the gases have lower temperatures by a metal screen. Or the screen part 8" may be made of a metal strip covered on both sides by ceramic material, and the same construction is applicable for the forward part of the screen 8 in the embodiment of FIGURES 1-6.

What I claim is:

1. A heating system for tunnel baking ovens adapted for baking articles of food and like heating chambers comprising a plurality of metal heating gas tubes passing above and below the oven tunnel space in the longitudinal direction thereof, a longitudinally extending partition wall positioned within each of at least a group of said tubes, the forward end of each of said partition walls terminating within the path of the flame of a burner arranged opposite to the entrance of each of said tubes and extending in a direction corresponding to the direction of each said burner flame path to guide the heating gases from the burner into and through the tube above and below the partition wall therein, and means for adjusting the proportional amount of heating gases streaming above and below the said partition wall through the said tube in response to a warping movement of the end of the said tube opposite the said burner by which the position of the said partition wall at the said tube end opposite the burner is altered with respect to the center line of the said burner.

2. Heating system according to claim 1, wherein each said partition wall is shaped near the entrance of each said tube as a half turn of a screw, said burner being immovable with respect to the said partition wall.

3. Heating system according to claim 1, wherein the said burner is supported movably opposite to the entrance of each said tube and mechanism is provided for moving said burner, said mechanism being controlled by means of a mechanical connection to the forward end of the said tube opposite the said burner.

4. A heating system for tunnel baking ovens adapted for baking articles of food and like heating chambers comprising a plurality of metal heating gas tubes passing above and below the oven tunnel space in the longitudinal direction thereof, a longitudinally extending partition wall positioned within each of at least a group of said tubes, the forward end of each of said partition walls terminating within the path of the flame of a burner arranged opposite to the entrance of each of said tubes and extending in a direction corresponding to the direction of each said burner flame path to guide the heating gases from the burner into and through the tube above and below the partition wall therein, and means for adjusting the proportional amount of heating gases streaming above and below each said partition wall through each said tube in response to a warping movement of the end of each said tube opposite the respective burner by which the position of the plane of the partition wall at the said tube end opposite the burner is altered with respect to the center line of the burner, said partition walls each having an upwardly arched cross section and the longitudinal edges of said partition walls being supported upon studs extending inwardly from the walls of said tubes.

5. A heating system for tunnel baking ovens adapted for baking articles of food and like heating chambers comprising a plurality of metal heating gas tubes passing above and below the oven tunnel space in the longitudinal direction thereof, a longitudinally extending partition wall positioned within each of at least a group of said tubes, the forward end of each of said partition walls terminating within the path of the flame of a burner arranged opposite to the entrance of each of said tubes and extending in a direction corresponding to the direction of each said burner flame path to guide the heating gases from the burner into and through the tube above and below the partition wall therein, and means for adjusting the proportional amount of heating gases streaming above and below each said partition wall through each said tube in response to a warping movement of the end of each said tube opposite the respective burner by which the position of the partition wall at the tube end opposite the burner is altered with respect to the center line of the burner, said partition walls dividing the cross section of each of said tubes in two unequal parts the larger one of which is situated on the side nearest to the baking ware which is transported through the oven tunnel.

References Cited

UNITED STATES PATENTS

| | | | |
|---|---|---|---|
| 1,763,349 | 6/1930 | Engels | 107—55 |
| 1,991,788 | 2/1935 | Cartter | 126—91 X |
| 2,137,868 | 11/1938 | Wilson. | |

WALTER A. SCHEEL, *Primary Examiner.*

J. SHEA, *Assistant Examiner.*